United States Patent [19]
Ono et al.

[11] Patent Number: 6,108,291
[45] Date of Patent: Aug. 22, 2000

[54] OPTICAL DISC APPARATUS ACCESSING METHOD AND SYSTEM THEREFOR

[75] Inventors: Kazuhiko Ono; Eiji Ikeda; Hiroshi Minoda; Akio Fukushima; Hiroaki Shioyama, all of Yokohama; Shigeki Inoue, Fujisawa, all of Japan

[73] Assignee: Hitachi, Ltd., Tokyo, Japan

[21] Appl. No.: 09/394,600

[22] Filed: Sep. 13, 1999

Related U.S. Application Data

[62] Division of application No. 08/888,469, Jul. 7, 1997, Pat. No. 6,002,655.

[30] Foreign Application Priority Data

Jul. 10, 1996 [JP] Japan ................................. 8-180910

[51] Int. Cl.$^7$ ..................................................... G11B 7/00
[52] U.S. Cl. .......................... 369/94; 369/44.28; 369/58
[58] Field of Search ................................. 369/94, 44.27, 369/44.28, 32, 54, 58, 47

[56] References Cited

U.S. PATENT DOCUMENTS

| | | | |
|---|---|---|---|
| 5,255,262 | 10/1993 | Best et al. ............................. | 369/275.1 |
| 5,428,597 | 6/1995 | Satoh et al. ............................... | 369/94 |
| 5,608,715 | 3/1997 | Yokogawa et al. ...................... | 369/94 |
| 5,881,032 | 3/1999 | Ito et al. ................................... | 369/32 |

*Primary Examiner*—Thang V. Tran
*Attorney, Agent, or Firm*—R. William Beard, Jr.; Frohwitter

[57] ABSTRACT

There are provided a plurality of information recording surfaces to be reproduced on one side of an optical disc to be reproduced, and when accessing control of an optical pickup over a plurality of recording layers is performed, first, a beam focal point of the optical pickup is moved using a moving device to the recording layer on which target information is recorded to thereby perform switching processing of information recording layers during reproduction, after which accessing control of the optical pickup is performed using control processing circuit similar to the access between the same recording layers, and with respect to the pausing operation, in a layer in which information is recorded from the inner circumference to the outer circumference, one track jumping is repeated toward the inner circumference, while in a layer in which information is recorded from the outer circumference to the inner circumference, one track jumping is repeated toward the outer circumference.

4 Claims, 7 Drawing Sheets

STRUCTURE OF A DVD DUAL-LAYER DISC

OBJECT LENS 12

PHYSICAL SECTOR LAYOUT OF DVD DUAL-LAYER DISC AND ADDRESS INFORMATION CONSTRUCTION

PHYSICAL SECTOR LAYOUT OF DVD DUAL-LAYER DISC AND ADDRESS INFORMATION CONSTRUCTION

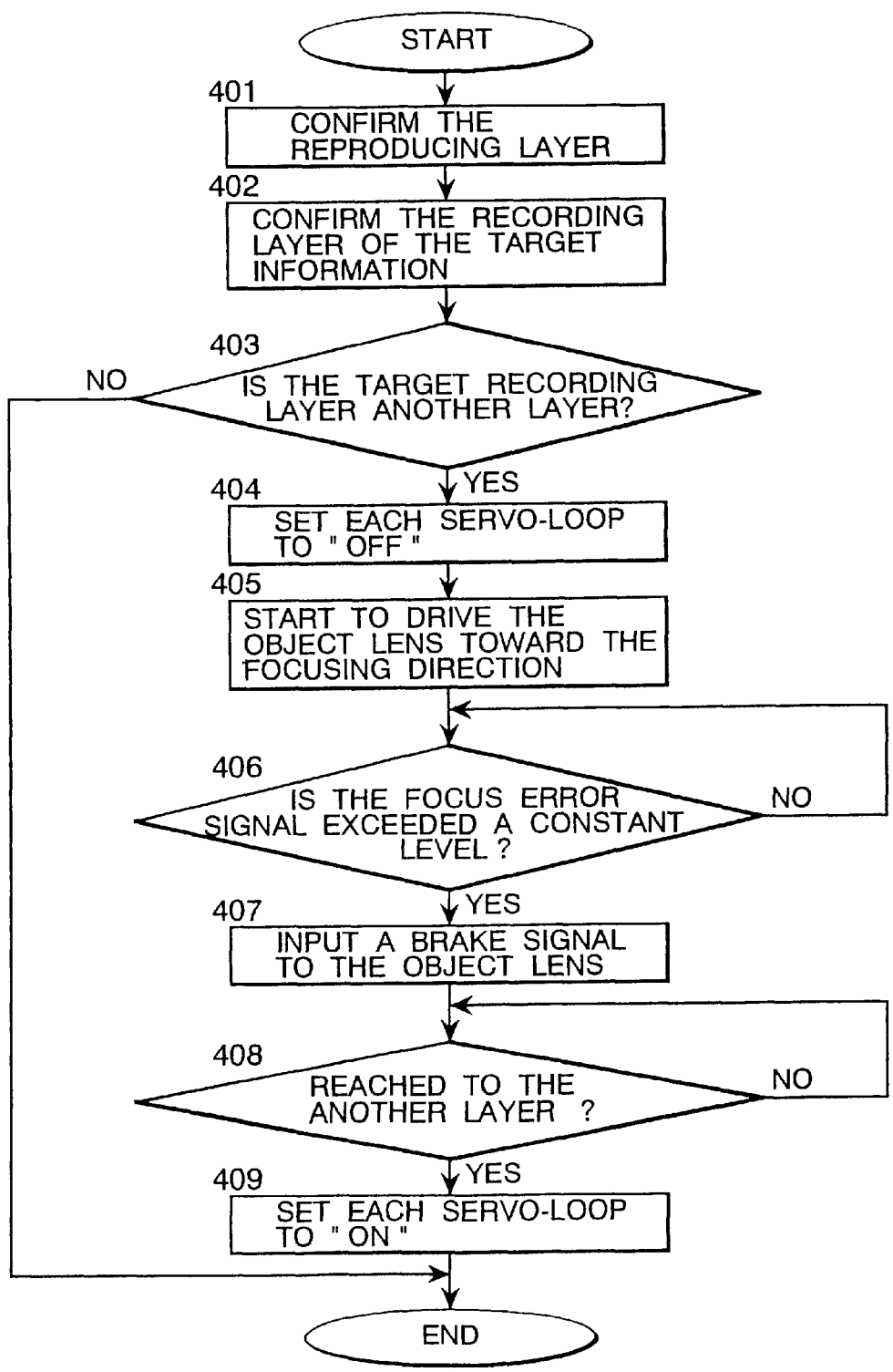

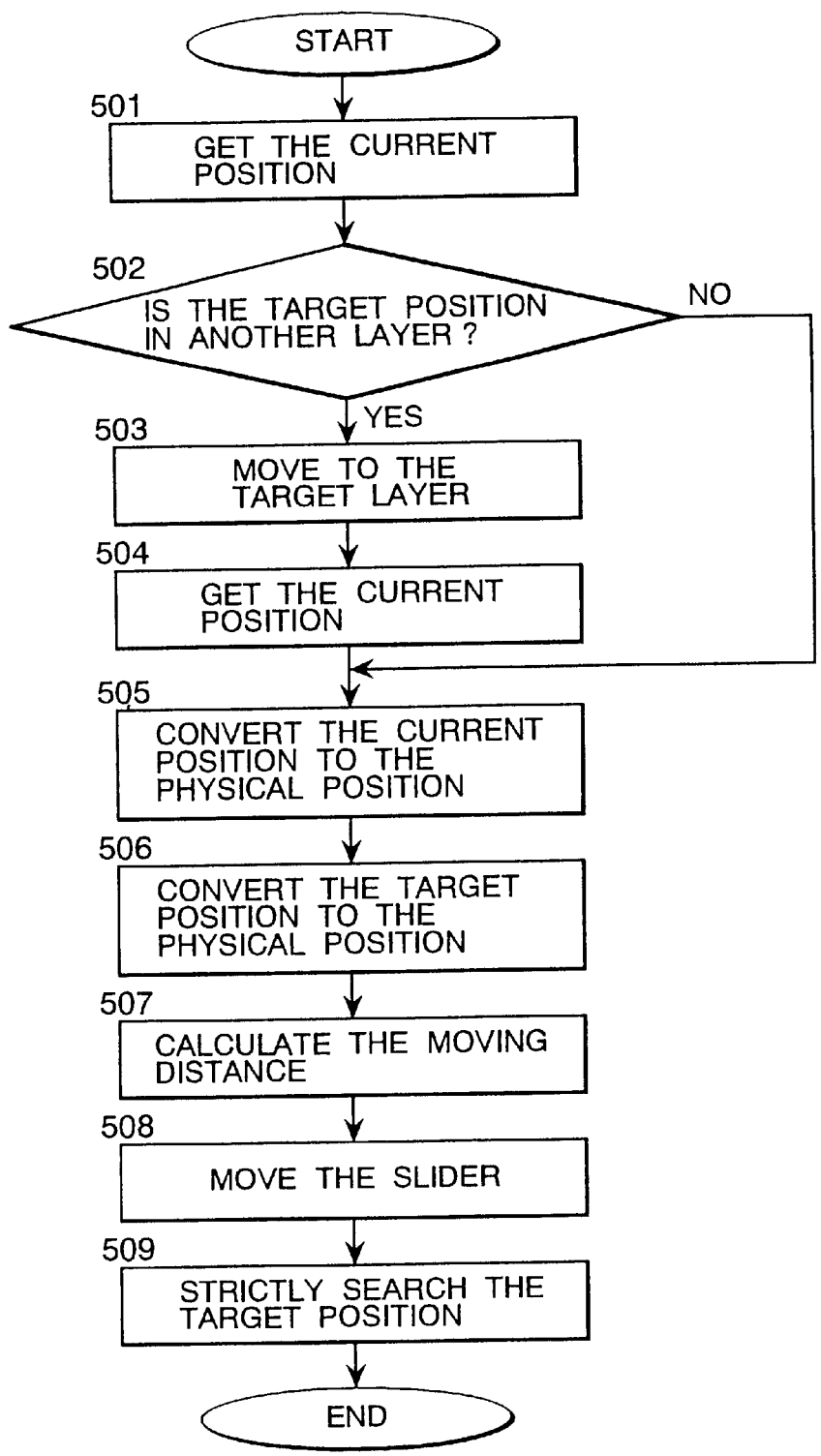

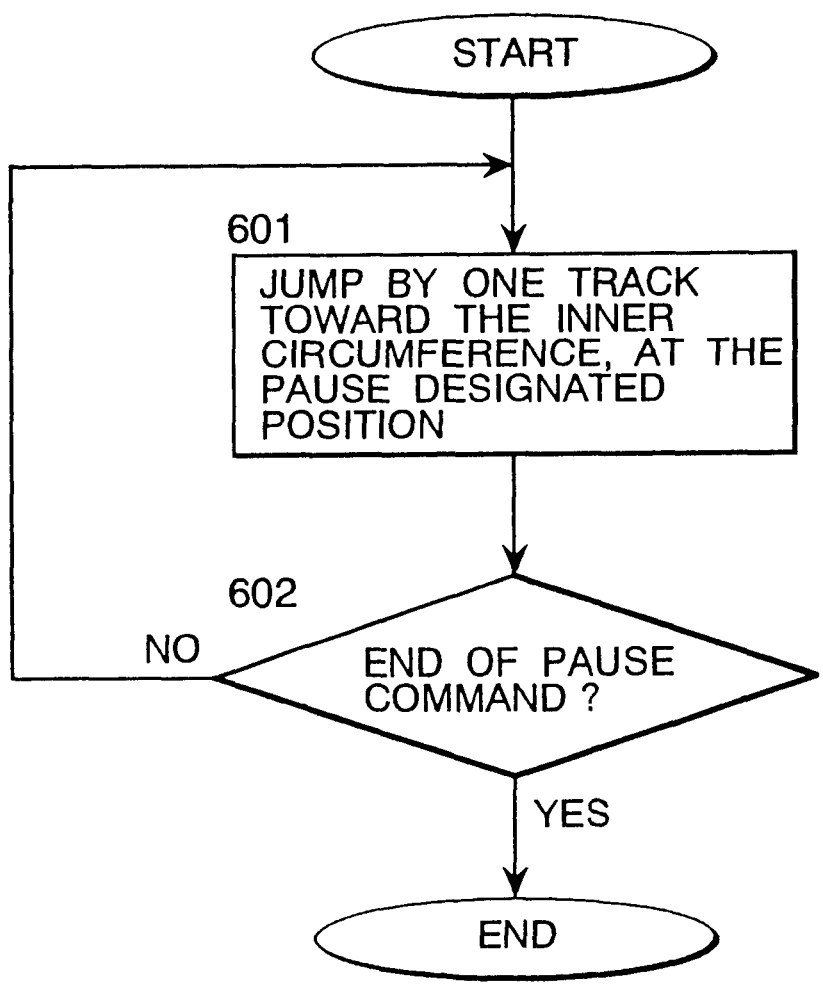

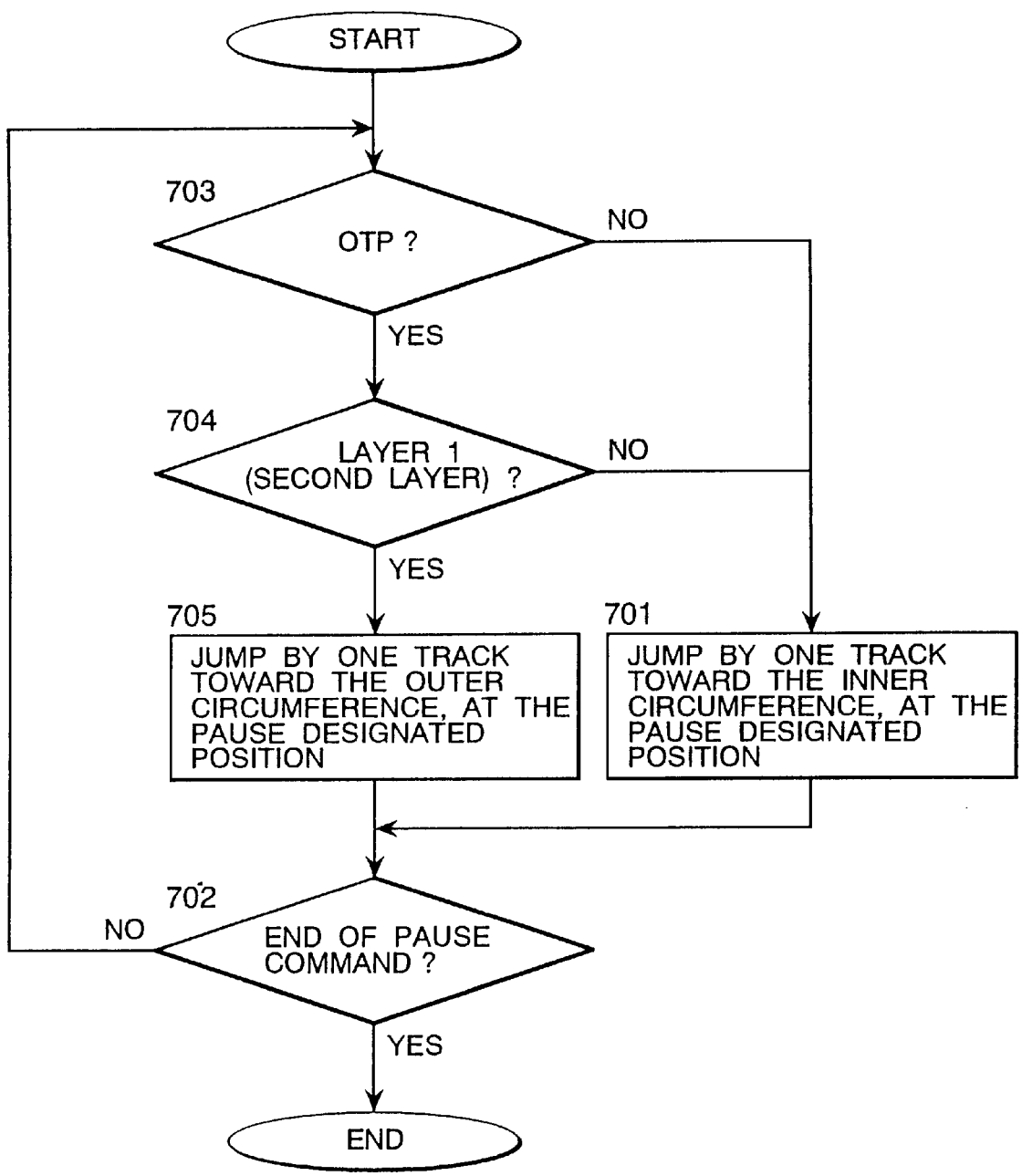

OPTICAL DISC APPARATUS ACCESSING METHOD AND SYSTEM THEREFOR

This application is a divisional of U.S. application Ser. No. 08/888,469, filed Jul. 7, 1997, now U.S. Pat. No. 6,002,655.

BACKGROUND OF THE INVENTION

1. Field of the Invention

The present invention relates to an optical disc apparatus accessing method and system therefor capable of reproducing an optical disc on one surface of which are provided plural layers of information recording surfaces.

2. Description of the Prior Art

In the optical disc as a recording medium, laser discs (LD) have been extensively popularized as media in which plural layers of information recording surfaces are provided. In these recording media, each layer of information recording surface is present on both surfaces of the media in terms of physical construction. Therefore, in the case where information recording layers to be reproduced need be switched, it is general that the disc is inverted or changed.

With the recent trend of larger capacity of data for a computer and practical use of recording and reproducing of digital moving picture information, it has been demanded to make the optical disc higher recording density. The specification of a large capacity optical disc such as DVD (Digital Versatile Disc) has been proposed, and an optical disc such as a dual-layer disc has been standardized in addition to a conventional information recording of a one-side single layer. Since these optical discs have a dual-layer information recording layer on one side, there is necessary a reproducing method different from the conventional reproduction of single layer disc depending on switching of an information recording layer to be reproduced, and the form of information recorded and how to use it. One method is an accessing method and the other is a pausing (temporary stop) method.

In the optical disc, in the case where an optical pickup is accessed to a recording position of read target information on the same information recording layer in order to realize the high speed access, normally, present position information recorded in the disc is first read to obtain the present position of the optical pickup. Then, a target position is obtained from a logic or physical address of read target information. These two positions are converted from an information recording format of the disc into physical position information, the distance on a disc plane between the two points is obtained, and the optical pickup is accessed to the target position by means for controlling a slider on which the optical pickup is loaded.

However, in the case of the optical disc having a plurality of information recording layers on one side, there is taken the procedure such that in the case where read target information is present on the other information recording layer, the track positions between the information recording layers are not always coincided, and the optical pickup is moved to the target position on the basis of position information of the information recording layer now being reproduced, after which the optical pickup is moved to the target information recording layer. This procedure has a problem in that accessing cannot be made to the target position at high speeds and accurately.

In addition, the one-side dual-layer disc of DVD includes two kinds, one being a parallel track path (hereinafter referred to as PTP) in which the recording path of the first layer is the same as that of the second layer as shown in FIG. 3 (1), and the other being an opposite track path (hereinafter referred to as OTP) in which the recording path of the first layer is reversed to that of the second layer as shown in FIG. 3 (2). In case of the OTP, the physical address of the second layer is provided without direct relation with that of the first layer, and therefore, accessing to the other information layer is impossible on the basis of the position information of the information recording layer now being reproduced.

Also, with respect to the pausing (temporary stop) operation, there is a problem in that the pausing is not obtained in the second layer of the disc of OTP in the state of the operation of the conventional reproduction of one-side single disc.

SUMMARY OF THE INVENTION

It is an object of the present invention to provide, in the reproduction of these discs having a plurality of recording layers, a method for carrying out an access control of an optical pickup accurately, at high speeds and easily, a method for carrying out a pausing operation accurately irrespective of kinds of discs and a system therefor.

For achieving the aforementioned object, according to the present invention, there is provided an accessing method for an optical disc apparatus for recording/reproducing an optical disc on one side of which are provided plural layers of information recording surfaces and system therefor, the method comprising:

recording/reproducing information on at least one information recording layer among said plural layers of information recording layers, and switching the information recording layer for information to be recorded/reproduced during the information recording/reproducing.

More specifically, according to the present invention, in starting the access control of an optical pickup over a plurality of recording layers, first, a beam focal point of the optical pickup is moved by using a moving means to a recording layer in which target information is recorded to switch information recording layers during reproduction, and after this, the distance on a disc plane between two points is obtained from a present position of the optical pickup on the information recording layer after movement and a target position of read information, using a control processing means similar to the access between the same recording layers to perform the access control of the optical pickup. Further, according to-the present invention, with respect to the pausing operation, whether or not a disc during reproduction is one-side dual-disc is stored in advance by an optical disc reproducing apparatus, and when instructions for pausing operation are given at the time of reproduction of the second layer of the OTP disc, the track jump direction of the pickup is reversed to that of the first layer.

The foregoing and other objects, advantages, manner of operation and novel features of the present invention will be understood from the following detailed description when read in connection with the accompanying drawings.

BRIEF DESCRIPTION OF THE DRAWINGS

FIG. 4 is a flowchart showing the flow of a switching process of reproducing information recording layer in one embodiment of the present invention;

FIG. 5 is a flowchart showing the flow of an access controlling process of an optical pickup in one embodiment of the present invention;

FIG. 6 is a flowchart showing the flow of conventional pausing operation; and

FIG. 7 is a flowchart showing the flow of conventional pausing operation.

DETAILED DESCRIPTION OF THE PREFERRED EMBODIMENTS

Figure 1:
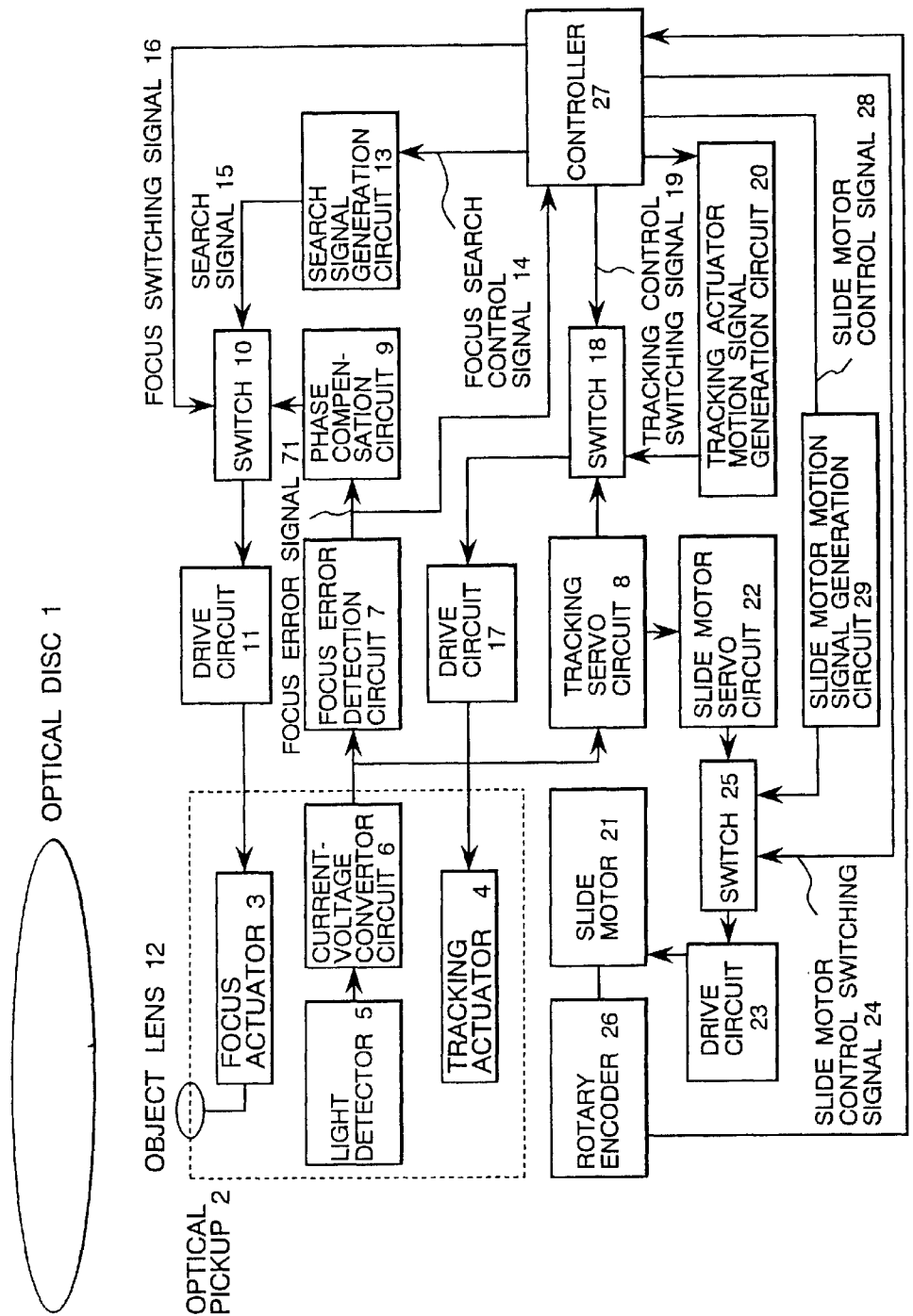
FIG. 1 is a block diagram of an optical disc apparatus forming the constitutional requirement of the present invention according to a first embodiment of the present invention.

The present invention will be explained hereinafter with reference to one embodiment shown in the drawings.

FIG. 1 is a block diagram of an optical disc apparatus forming the constitutional requirement of the present invention according to a first embodiment of the present invention. The present optical disc reproducing apparatus is composed of, other than those shown here, a decoder block for reproducing, demodulating, error-correcting signals for decoding reproduced data, a system control block for controlling the entire optical disc apparatus, an interface block for the interface with external information processing equipment, an encoder block for modulation and error-correction for recording data, etc. The blocks not directly relating to the present invention out of the above-described blocks will be omitted in their explanation and drawings.

First, the functions of the blocks shown will be roughly explained below.

An optical disc 1 is an optically readable information storage medium such as a compact disc (CD), a digital versatile disc (DVD), etc. Information is recorded in a signal recording surface at a concave portion called a pit.

An optical pickup 2 is to reproduce information from the optical disc 1 and comprises a semiconductor laser and optical parts not shown, a focus actuator 3, a tracking actuator 4, and a light detector 5. Light departed from the semiconductor laser is focussed at a signal recording surface of the optical disc 1 to form an optical spot. Since the quantity of light reflected from the optical spot changes due to the presence or absence of pit, the change of the quantity of light can be detected as a signal to reproduce the signal.

The light detector 5 is to convert the change in the quantity of light reflected from the optical disc 1 into a current signal. An output of the light detector 5 is converted into a voltage signal by a current-voltage converter circuit 6, which voltage signal is transmitted to a focus error detection circuit 7 and a tracking servo circuit 8. A focus error signal 71 detected by the focus error detection circuit 7 is applied to the focus actuator 3 via a phase compensation circuit 9, a switch 10 and a drive circuit 11 to form a focus servo loop for controlling an objective lens 12 in a focussing direction.

A search signal generation circuit 13 is a circuit for generating a search signal 15 according to a focus search control signal 14. The search signal 15 is transmitted to the drive circuit 11 and applied to the focus generator 3 whereby the objective lens 12 can be moved in the focussing direction separately from the focus servo loop.

The switch 10 is switched according to the state of a focus switching signal 16 to switch the switch 10 so that an output of the phase compensation circuit 9 is transmitted to the drive circuit 11 whereby the operation of the focus servo loop can start.

The tracking servo circuit 8 comprises a tracking error detection circuit, a phase compensation circuit and the like, and an output signal is applied to the tracking actuator 4 via a drive circuit 17 to form a tracking servo loop for controlling the objective lens 12 in a tracking direction.

In the switch 18, the tracking servo loop is opened by a tracking control switching signal 19, and the objective lens 12 can be moved in the tracking direction by an output signal of a tracking actuator motion signal generation circuit 20.

A slide motor 21 is to move the optical pickup 2. Normally, an output signal of the tracking servo circuit 8 is transmitted to a drive circuit 23 via a slide motor servo circuit 22 to form a slide motor servo loop. In the case where the optical pickup is moved for the access operation or the like, a switch 25 is switched by a slide motor control switching signal 24, and a controller 27 outputs a slide motor control signal 28 to a slide motor motion signal generation circuit 29 according to speed and position information obtained by an output signal of a rotary encoder 26 to drive a slide motor 21 via the drive circuit 23.

Next, one example of an optical disc on one side of which are provided two layers of information recording layers will be explained. The present optical disc reproducing apparatus reproduces CD, DVD single layer, and DVD dual layer discs. The dual disc of DVD will be explained below as an example.

Figure 2:
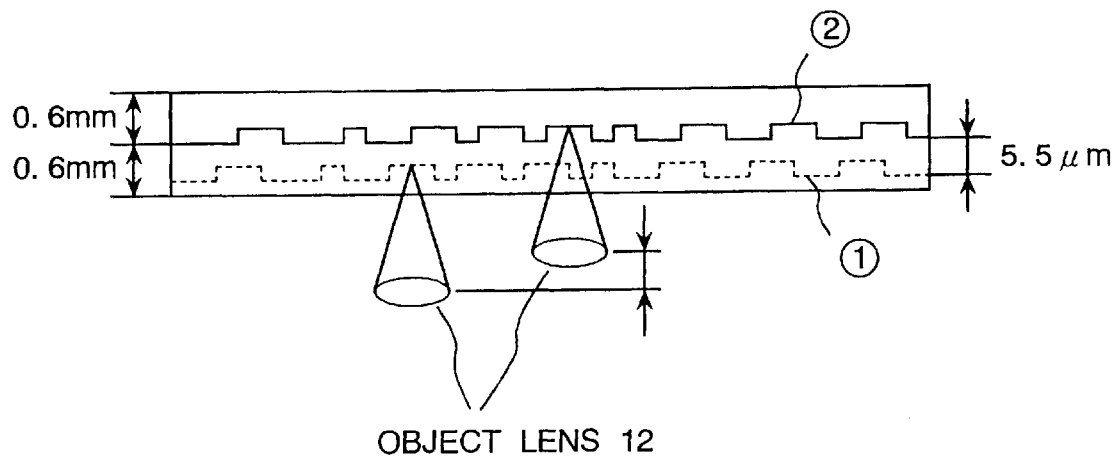
FIG. 2 is view schematically showing the construction of a DVD dual-layer disc used in the present embodiment.

FIG. 2 shows the construction of a DVD dual-layer disc.

The DVD dual-layer disc as two information recording layers arranged on one side of the disc at intervals of approximately 55 μm thickness-wise of the disc. These information recording layers are normally formed separately and mechanically pasted together.

In FIG. 2, a first layer ① is a translucent recording film, and a second layer ② is a reflecting film formed of aluminum vapor deposition or the like. The reproduction of the dual-layer disc is carried out, as shown in FIG. 2, by irradiating a laser beam from the first layer ① side and moving the objective lens 12 in the direction at right angles to the disc to form a focal point to the first layer ① and the second layer ②.

Figure 3A:
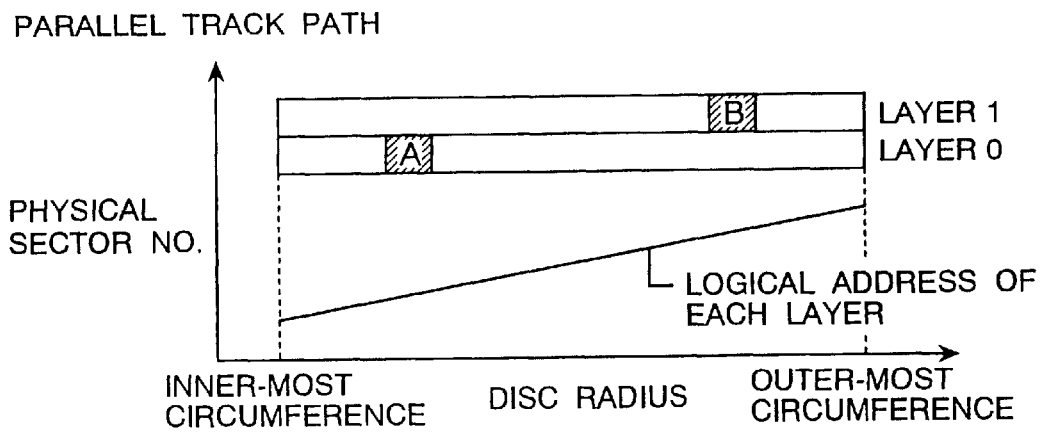
FIGS. 3(a) and 3(b) are respectively views schematically showing a physical sector layout of DVD dual-layer disc and address information construction used in the present embodiment.
Figure 3B:
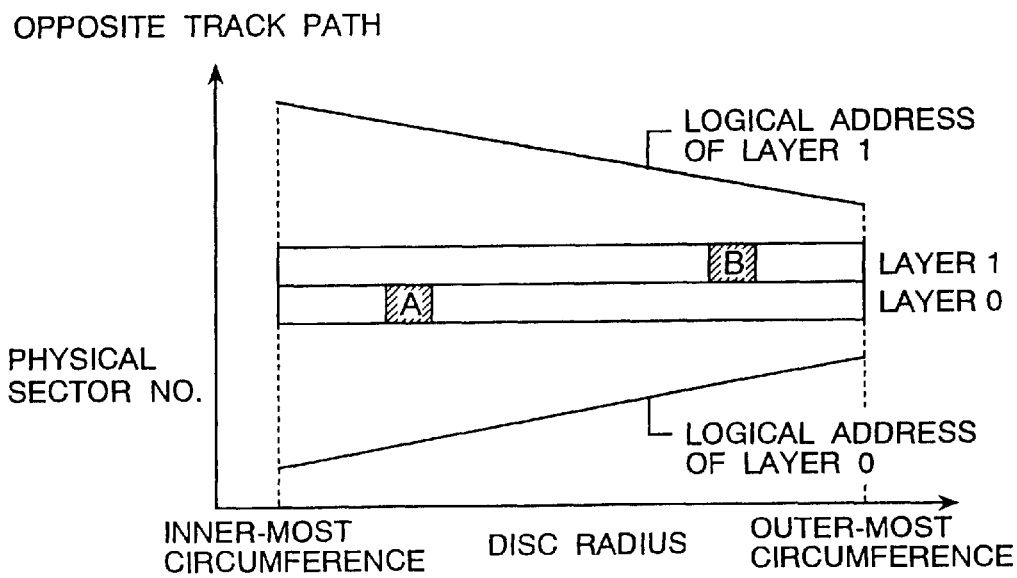

FIGS. 3(a) and 3(b) are respectively views schematically showing a physical sector layout of DVD dual-layer disc and address information construction.

FIG. 3(a) shows a parallel track path (PTP). A physical sector of the same address, which is not related to address information and incremented from the inner circumference to the outer circumference of the disc, is present in each information recording layer between a physical sector on the layer 0 (first layer) and a physical sector on the layer 1 (second layer).

FIG. 3(b) shows an opposite track path (OTP). Address information of a start physical sector on the layer 1 (second layer) is represented by address information whose each bit being inverted of address information of a final physical sector on the layer 0 (first layer), and the address information of the layer 1 (second layer) is incremented from the outer circumference to the inner circumference of the disc and recorded. That is, the address information of the layer 0 (first layer) is incremented from the inner circumference to the outer circumference of the disc whereas the address information of the layer 1 (second layer) is incremented from the outer circumference to the inner circumference of the disc.

In the DVD disc, information of one side single-layer disc, one side dual-layer disc, disc of PTP or disc of OTP is recorded as index information of disc in a control data area of the disc, and information of the layer 0 (first layer) of the layer 1 (second layer) is recorded in the sector address.

Accordingly, in the optical disc reproducing apparatus, it is possible to know what disc is contained by reading the index information, and it is possible to carry out the special reproduction conveniently by storing whether the disc being reproduced is the disc of PTP or the disc of OTP in the optical disc reproducing apparatus.

In what disc of PTP shown in FIG. 3(*a*) and of OTP shown in FIG. 3(*b*), in the case where accessing between and over information recording layers so that the optical pickup is moved from the physical sector A present on the layer 0 (first layer) to the physical sector B present on the layer 1 (second layer), the movement of the optical pickup in a direction of thickness of the disc for switching the information recording layer in which the optical spot forms a focal point is necessary in addition to the movement of the optical pickup in a radial direction of the disc in the prior art.

The procedure for switching an information recording layer to be reproduced in the present optical disc apparatus will be explained below. In the ensuing procedure, an example will be explained in which the processing of CPU which functions as a system controller is accomplished by soft-ware.

FIG. 4 is a flowchart showing the flow of a switching process of reproducing information recording layer.

In 401, confirmation is made by information in the sector address whether or not the information recording layer being now reproduced while the objective lens of the optical pickup forms a focal point is the first layer or the second layer. In 402, confirmation is made of the recording layer of the target information.

As a result of the processing in 401 and 402, if judgement is made that the target recording layer is another layer, the servo loop such as the focus servo, tracking servo, etc. for maintaining a focal point of the optical spot in an intended position of the information recording layer of the disc is set to off, in 404.

After this, in 405, a focus search control signal for driving the objective lens toward the focusing direction of the target information recording layer starts to be delivered. As a result, a focus error signal starts to be output as the focal point of the optical spot gradually moves close to the adjacent information recording layer.

In 406, the focus search control signal is continued to deliver till exceeding a preset judging level while monitoring the focus error signal.

After exceeding the judging level, in 407, a signal reverse in phase to the drive signal applied in 405 is output to the focus search control signal for the drawing stabilization of the thereafter focus servo loop to apply a brake to the focus actuator.

In 408, the zero cross point of the focus error signal is detected to thereby judge to be reached to the adjacent information recording layer.

Thereafter, in 409, the switch is switched to set the focus servo loop to on, and to set other servo loops to on sequentially.

Now, in the optical disc in which two information recording layers are actually provided on one side, accessing over the information recording layers will be explained.

Generally, in the optical discs such as CD and DVD, the procedure is employed in which the logical present position and target position at the start of accessing are converted into the physical position on the disc, the difference thereof is obtained to calculate the distance on the disc plane between relative two points, and the optical pickup is moved to the target position at high speeds without reading the position information recorded in the moving disc using control means for the slider on which the optical pickup is loaded.

One example of the method for converting the present position and the target position into the physical position will be explained. Let R0 (m) be the radius from the center of the disc of the sector number S0 as a reference on the disc, CLV (m/s) be the linear speed when the information of disc is recorded, TP (m) be the track pitch, and T0 be the time required to reproduce 1 sector. Then, the relation with the radius R1 (m) from the disc center of the sector number S1 present on the same information recording layer can be expressed by $$R1^2 = (CLV \cdot TP \cdot T0(S1-S0)/\pi) + R0^2$$

In the case of the dual-disc, the information recording layers are different in the linear speed and the track pitch in terms of forming the disc, it is therefore necessary to use the above-described formula every information recording layer in which sector is recorded.

In the case where accessing is carried out over the information recording layers, in the disc of PTP, the physical sector is provided from the inner circumference to the outer circumference of the disc in both the layer 0 (first layer) and the layer 1 (second layer). So, there is a method comprising: moving the target distance on the basis of the information of the information recording layer now being reproduced, approaching to the target sector while reading the present position information recorded in the information recording layer being reproduced, and after this, accessing to the target sector over the information recording layers. However, since the layer 0 and the layer 1 are not always coincided in the track pitch and the linear speed, the wasteful access time to the final target sector occurs.

Further, in the disc of OTP, the layer 0 is totally different in the physical sector from that of the layer 1, and it is impossible to access to the target sector of the other information recording layers on the basis of the information of the information recording layer now being reproduced.

In the present embodiment, the aforementioned problems are solved by the following processing.

FIG. 5 is a flowchart showing the flow of an access controlling process of an optical pickup according to the present invention.

In the present embodiment, first, in 501, confirmation is made of the position of the optical pickup by reading the present position information recorded in the optical disc.

Then, in 502, judgement is made whether or not the recording position of the target information subjected to accessing is the same as the present information recording layer.

When the information recording layer is not the same, in 503, the beam focal point of the optical pickup is moved to the target information recording layer by the focus moving means previously explained with reference to FIG. 4.

After movement, in 504, confirmation is made of the present position of the optical pickup on the information recording layer after movement by the processing similar to that of 501.

In 505 and 506, the present position and the target position are converted to the physical position on the disc.

In 507, the distance on the disc plane between the relative two points is calculated from the physical positions of the present position and the target position obtained by the above described methods. In 508, the optical pickup is moved to the target position at high speeds, without reading the position information recorded in the moving disc, using the control means of the slider on which the optical pickup is loaded.

After movement, in 509, the optical pickup is accessed to the target information recording position while confirming the position information recorded in the disc.

In the above-described series of processings, also in the case of accessing over the information recording layers, accessing is carried out merely adding the processings of 502, 503 and 504, so that the processing means similar to the conventional accessing processing in the same information recording layer after 505 can be used, thus enabling the high speed accessing and enabling processing easily.

The pausing operation according to the present invention will be explained hereinafter with reference to FIGS. 6 and 7. FIG. 6 is a flowchart of the pausing operation heretofore used in CD and LD. FIG. 7 is a flowchart of the pausing operation according to the present invention. In both CD and LD, information is recorded along the spiral signal track from the inner circumference to the outer circumference of the disc. In FIG. 6, upon command of the pausing operation, in 601, "Jump by one track toward the inner circumference, at the pause designated position." whereby the pausing is realized. In 602, this operation is repeated till receipt of the end of pause command. Also in the single-layer disc of DVD and the PTP disc, pausing can be realized in FIG. 6. However, in the layer 1 (second layer) of the OTP disc, the FIG. 6 method rapidly progresses, failing to provide the pausing operation.

In FIG. 7, in the optical disc reproducing apparatus, the presence of the OTP disc is read from the index information. Upon receipt of command of pausing operation, first, in 703, "OTP disc ?" is checked, and in 704, "Layer 1 (second layer) ?" is checked from the sector address being reproduced. Only at the time of the layer 1 (second layer) in the OTP disc, "Jump by one track toward the outer circumference, at the pause designated position" in 705 whereby the pausing operation is realized.

While in the embodiments according to the present invention, a description has been made of the case of the dual-layer disc, it is to be noted that needless to say, the accessing method and the pausing method according to the present invention can be applied to the disc reproducing apparatus having a plurality of information recording layers such as three layers, four layers, etc.

According to the present invention, in the optical disc apparatus having a plurality of information recording surfaces to be reproduced on one side of the optical disc and which is necessary to switch these information recording layers to be reproduced during the operation, even in the case where the recording position of intended information is provided other than the information recording layer now being reproduced, it is possible to carry out the access control of the optical pickup using the control processing means similar to the access between the same recording layers accurately, at high speeds and relatively easily, and further in both PTP disc and OTP disc, the pausing operation can be realized.

What is claimed is:

1. An accessing method for an optical disc apparatus for recording/reproducing an optical disc on one side of which are provided plural layers of information recording surfaces, the method comprising the steps of:

when at least one information recording layer among said plural layers of information recording layers is recorded in the OTP (Opposite Track Path) type, recording the OTP type on said information recording layer;

reproducing the information of said OTP type information recording layer; and upon receipt of command of pausing during the execution of said reproduction, performing the pausing operation by jumping an optical pickup by one track toward the outer circumference of the disc at the pause designated position.

2. An accessing method for an optical disc apparatus for recording/reproducing an optical disc on one side of which are provided plural layers of information recording surfaces, said method comprising the steps of:

when at least one information recording layer among said plural layers of information recording layers is recorded in the OTP (Opposite Track Path) type, recording the OTP type on said information recording layer;

when at least another information recording layer among said plural layers of information recording layers is recorded in the PTP (Parallel Track Path) type, recording the PTP type on said information recording layer;

reproducing information of the information recording layer of either of said types;

upon receipt of command of pausing during the execution of said reproduction and when said information recording layer is recorded in the OTP type, performing the pausing operation by jumping an optical pickup by one track toward the outer circumference of the disc at the pause designated position; and upon receipt of command of pausing during the execution of said reproduction and when said information recording layer is recorded in the PTP type, performing the pausing operation by jumping an optical pickup by one track toward the inner circumference of the disc at the pause designated position.

3. An accessing system for an optical disc apparatus for recording/reproducing an optical disc on one side of which are provided plural layers of information recording surfaces, comprising:

when at least one information recording layer among said plural layers of information recording layers is recorded in the OTP (Opposite Track Path) type, means for recording the OTP type on said information recording layer;

means for reproducing the information of said OTP type information recording layer; and upon receipt of command of pausing during the execution of said reproduction, means for performing the pausing operation by jumping an optical pickup by one track toward the outer circumference of the disc at the pause designated position.

4. An accessing system for an optical disc apparatus for recording/reproducing an optical disc on one side of which are provided plural layers of information recording surfaces, comprising:

when at least one information recording layer among said plural layers of information recording layers is recorded in the OTP (Opposite Track Path) type, means for recording the OTP type on said information recording layer;

when at least another information recording layer among said plural layers of information recording layers is recorded in the PTP (Parallel Track Path) type, means for recording the PTP type on said information recording layer;

means for reproducing information of the information recording layer of either of said types;

upon receipt of command of pausing during the execution of said reproduction and when said information recording layer is recorded in the OTP type, means for performing the pausing operation by jumping an optical pickup by one track toward the outer circumference of the disc at the pause designated position; and upon receipt of command of pausing during the execution of said reproduction and when said information recording layer is recorded in the PTP type, means for performing the pausing operation by jumping an optical pickup by one track toward the inner circumference of the disc at the pause designated position.

* * * * *